United States Patent
Ko et al.

(10) Patent No.: US 7,366,498 B2
(45) Date of Patent: Apr. 29, 2008

(54) CONTROL SYSTEM AND METHOD FOR HOME NETWORK SYSTEM

(75) Inventors: Myoung Hwa Ko, Gumi-si (KR); Kyong Soo Hwang, Daegu (KR); So Hee Heo, Daegu (KR)

(73) Assignee: LG Electronics Inc., Seoul (KR)

( * ) Notice: Subject to any disclaimer, the term of this patent is extended or adjusted under 35 U.S.C. 154(b) by 549 days.

(21) Appl. No.: 10/879,205

(22) Filed: Jun. 30, 2004

(65) Prior Publication Data

US 2005/0009498 A1    Jan. 13, 2005

(30) Foreign Application Priority Data

Jul. 7, 2003    (KR) ............... 10-2003-0045766

(51) Int. Cl.
*H04Q 7/20* (2006.01)

(52) U.S. Cl. .............. 455/411; 455/418; 455/420

(58) Field of Classification Search ............... None
See application file for complete search history.

(56) References Cited

U.S. PATENT DOCUMENTS

2002/0180581 A1* 12/2002 Kamiwada et al. .......... 340/5.2

FOREIGN PATENT DOCUMENTS

| JP | 08106579 | 4/1996 |
|---|---|---|
| WO | WO 00/39964 | 7/2000 |
| WO | WO 02/069627 A2 | 9/2002 |

OTHER PUBLICATIONS

XP-00152876, Jae-Min Lee, Kwan-Joo Myoung, Kam-Rok Lee, Dong-Sung, and Wook-Hyun Kwon, CISL, "A New Network Protocol for Controlling and Monitoring Home Appliances-HNCP", 2002, pp. 312-313, School of Electrical Engr. and Computer Sci. Seoul National University, Seoul 151-742, Korea.
English Translation of Chinese Office Action dated Mar. 17, 2006.

* cited by examiner

*Primary Examiner*—Erika A. Gary
(74) *Attorney, Agent, or Firm*—Ked & Associates, LLP

(57) ABSTRACT

A control method and a control system for a home network system in a multi-user environment are disclosed. The control system includes a plurality of slave devices, a user ID receiver receiving user ID data from a user, and a master device coupled to the slave devices for operation control. The master device includes a memory and a controller coupled to the memory and the user ID receiver. The memory initially prestores user-specific control settings preset by a plurality of preregistered users and user ID data of the preregistered users. Then, the controller authenticates the user upon receiving the user ID data from the user ID receiver, and it automatically controls operational functions of the slave devices according to the user-specific control settings of the authenticated user, which is extracted from the memory.

24 Claims, 8 Drawing Sheets

CONTROL SYSTEM AND METHOD FOR HOME NETWORK SYSTEM

This application claims the benefit of Korean Patent Application No. P2003-45766, filed on Jul. 7, 2003, which is here

BACKGROUND OF THE INVENTION

1. Field of the Invention

The present invention relates to a home network system, and more particularly, to a control system and method for a home network system in a multi-user environment, where the home network system includes a plurality of registered slave devices and a master device coupled to the slave devices for controlling their operational functions.

2. Discussion of the Related Art

In general, a home network system is a home automation control system, in which a master home appliance (or a master home server) is able to control operations of one or more slave home appliances. More specifically, a user of the master home appliance is able to control the operations of various slave home appliances (or slave devices), such as a refrigerator, an air conditioner, a washer, a gas range, a boiler, and so on.

Most of the microcomputers used in home application have serial communication functions. Therefore, a wide range of slave home appliances having inter-communicative functions is being extensively developed. The size of the resources used in such communications varies widely depending upon the characteristics of the slave home appliances.

In order to operate basic functions in a network system having a personal computer (PC) and corresponding peripheral devices, or in a digital television and other multi-media devices, such as a personal computer, internet refrigerators, and so on, a hardware having high function configurations should be adopted. Accordingly, a large amount of data and a communication standard suitable for high speed communications, namely, a home network control protocol (HNCP), which determines a signal flow sequence and a method of connecting signal lines to enable the intercommunication among the devices within the network, is required.

In the home network system associated with the HNCP, an electrical appliance corresponding to the master device is electrically connected to a plurality of slave home appliances via a power line, thereby enabling the master device to control the operations of the plurality of slave devices.

When a user executes a user interface function, such as an on-screen display (OSD) menu for controlling the home network directly from the master device, and selects slave home appliances to be controlled and the corresponding control commands from the OSD menu, the microcomputer within the master device transmits the control commands selected by the user to the corresponding slave home appliance.

However, the related art home network system is disadvantageous in that when the user returns home and wishes to control his or her home network, the user is required to personally and directly input the desired control command into the master device for each of the slave home appliances the user wishes to control, which is an inconvenient process for the user, thereby lowering the efficiency of the home network system.

SUMMARY OF THE INVENTION

Accordingly, the present invention is directed to a control system and a method for home network system that substantially obviates one or more problems due to limitations and disadvantages of the related art.

An object of the present invention is to provide a control system and method for home network system allowing a user to automatically control a home network depending upon a prestored home network control command, based on user-specific control settings, upon the user's return home.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a home network system in a multi-user environment includes registering a plurality of users by prestoring their user identification (ID) data into a memory, prestoring user-specific control settings preset by each registered user into the memory, and authenticating a user when the user is determined to be one of the registered users. The method further includes automatically controlling operations of a plurality of slave devices according to user-specific control settings of the authenticated user.

In another aspect of the present invention, a control system for a home network system in a multi-user environment includes a plurality of slave devices, a user ID receiver receiving user identification (ID) data from a user, and a master device coupled to the plurality of slave devices. The master device includes a memory prestoring user-specific control settings preset by a plurality of preregistered users, respectively, and a controller coupled to the user ID receiver for authenticating the user upon receiving the user ID data from the user ID receiver, wherein the controller automatically controls operational functions of the slave devices according to the user-specific control settings of the authenticated user, which is extracted from the memory.

In a further aspect of the present invention, a television receiver for controlling a plurality of slave devices in a home network system includes a user ID receiver receiving user identification (ID) data from a user, a memory prestoring user-specific control settings preset by a plurality of preregistered users, respectively, and a controller coupled to the user ID receiver and the memory for authenticating the user upon receiving the user ID data from the user ID receiver, wherein the controller automatically controls operational functions of the slave devices according to user-specific settings of the authenticated user, which is extracted from the memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
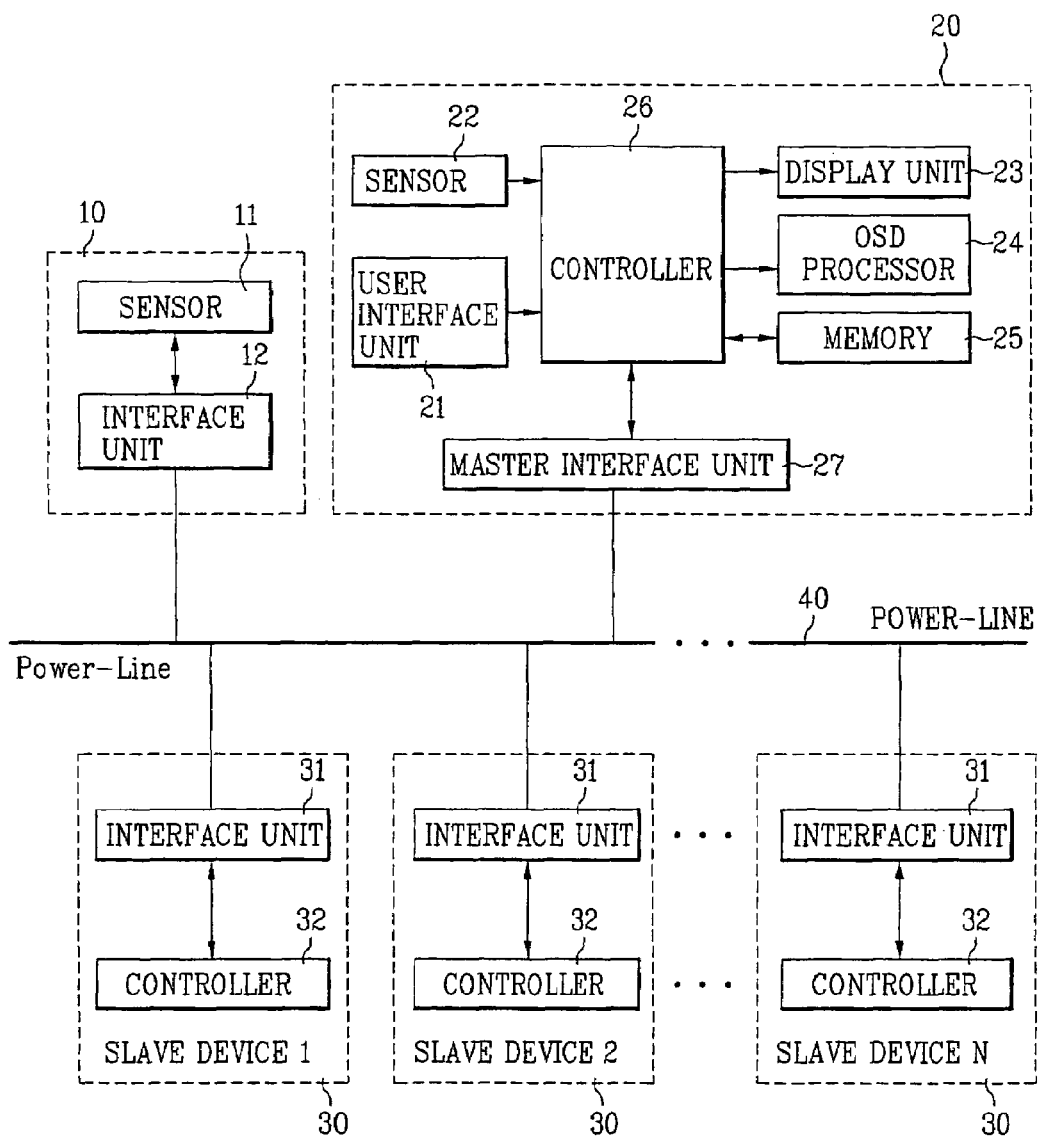
FIG. 1 illustrates a control system for a home network system according to the present invention.

FIG. 1 illustrates a control system for a home network system according to the present invention. Referring to FIG. 1, the control system includes a plurality of slave devices 30, a user ID receiver 10 receiving user identification (ID) data from a user for user authentication, and a master device 20 coupled to the plurality of slave devices through a power-line 40. The master device 20 includes a memory 25 prestoring user-specific control settings preset by a plurality of preregistered users, respectively, and a controller 26 coupled to the user ID receiver 10 for authenticating the user upon receiving the user ID data from the user ID receiver 10, where the controller 26 automatically controls operational functions of the slave devices 30 according to the user-specific control settings of the authenticated user which is extracted from the memory 25.

The user ID receiver 10, the master device 20, and the plurality of slave devices 30 are each provided with a corresponding interface unit 12, 27, and 31 connected to the power line 40 in order to electrically connect the user ID receiver 10 and the master device 20, or the master device 20 and the plurality of slave devices 30. Herein, a Power Line Carrier (PLC) modem connected to an external power line can be used as the interface unit 12, 27, and 31 for data communication.

In the present invention, the user ID receiver 10 includes a sensor 11 and the interface unit 12. The sensor 11 may be installed near the home entrance, for example, in order to allow the user to input his or her user identification (ID) data more easily and promptly upon his or her return home. The interface unit 12 is connected to the power line 40 in order to transmit the user ID data, inputted by the user and detected from the sensor 11, to the master device 20. Herein, the sensor 11 is able to receive the user's own fingerprint, iris, voice, and weight information, and to send the received information to the master device 20.

A digital television (DTV) receiver, which often used as a main master device in a household environment, will be given as an example for the master device 20. A sensor 22 provided within the digital television receiver 20 may be identical to the sensor 11 in the user ID receiver 10. A set of user ID data is inputted in the sensor 22 to register or authenticate a user. The memory 25 stores data for running a basic operating system (OS), a device driver for operating a plurality of small-sized circuit blocks, and a plurality of menu data, such as a user interface module, for controlling the basic operations of the digital television receiver 20 and the operations of the home network.

In addition, a HNCP module and a user interface module is further included in the specific area of the memory. The user interface module consists of an interface for representing control settings included in the conventional digital television receiver, such as Channel, Video, Audio, Time, and General options, and a set of modules for editing and executing Configuration Setup options for representing the control of the home network control protocol (HNCP), in other words, the Home Network, Search/Register Device, Timer Operation On/Off, User-specific Control Settings, and Network Environment Setup options.

The digital television receiver 20 according to the present invention further includes an on-screen display (OSD) processor 24 for processing the menu data stored to the memory 25 so as to display the stored data as an OSD menu, a display unit 23 for displaying the OSD menu processed at the OSD processor 24, a user interface unit 21 for registering the user ID data via the displayed OSD menu and for inputting the home network control commands controlling the one or more slave devices, and a controller 26 controlling the operational functions by reading the home network control commands preset by the corresponding user, when a user ID data matching the user ID data inputted from the user ID receiver 10 exists in the memory 25, and by extracting the command to the corresponding slave device.

Figure 2:
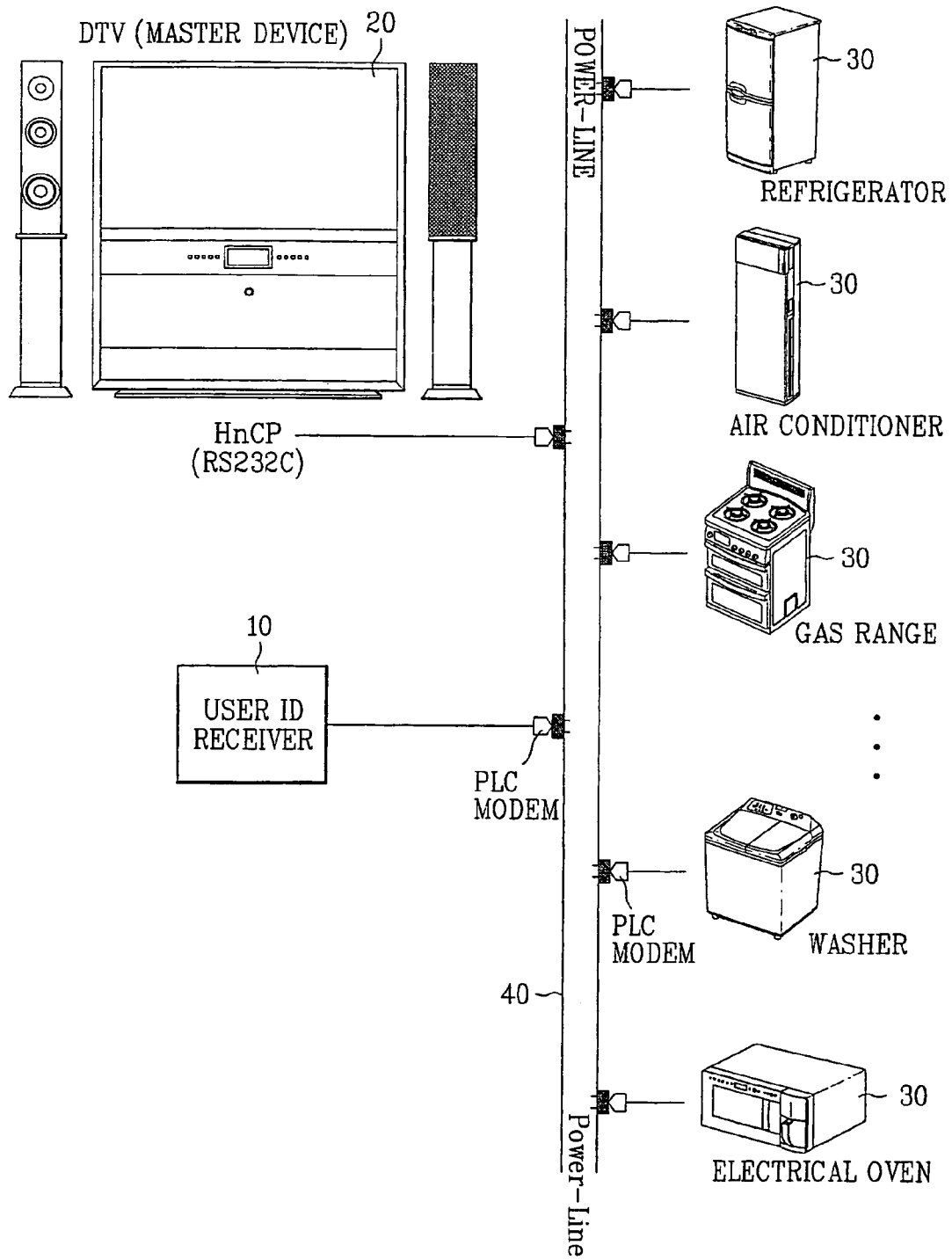
FIG. 2 illustrates an actual example of the control system according to the present invention shown in FIG. 1.

FIG. 2 illustrates an actual example of the control system according to the present invention shown in FIG. 1. Referring to FIG. 2, the master device 20 is a digital television (DTV) receiver, and the plurality of slave devices are a refrigerator, an air conditioner, a gas range, a washer, and an electrical oven. The TV receiver 20 is connected to the power line 40 via a PLC modem and the slave devices 30 and the user ID receiver 10 are connected to the power line 40 in a similar manner. The TV receiver 20 authenticates a user upon receiving the user's ID information from the user ID receiver 10 or from the sensor 22 provided within the TV receiver 20 and automatically controls operational functions of the slave devices 30 according to user-specific control settings of the authenticated user, which is extracted from the memory 25.

Figure 3:
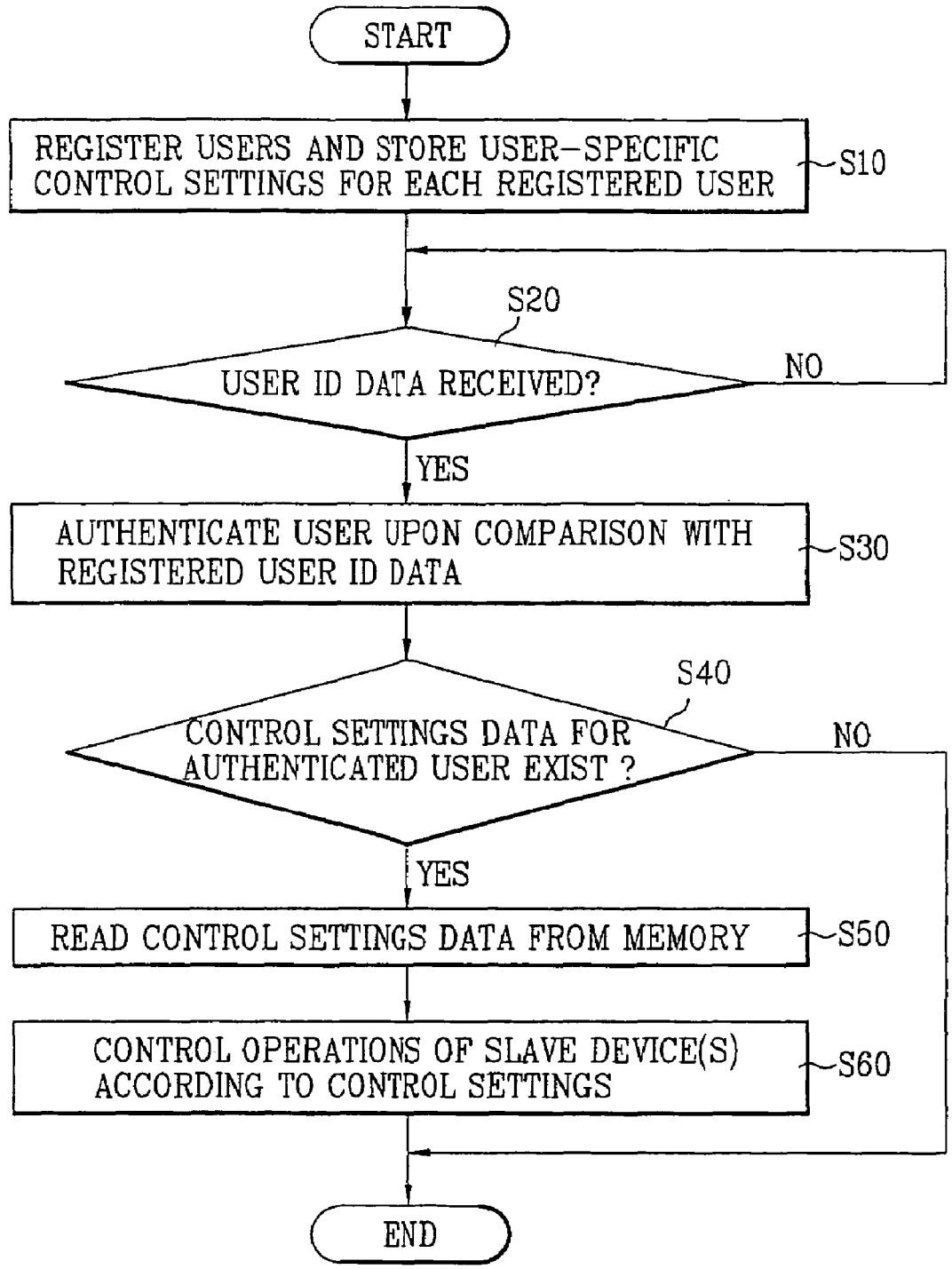
FIG. 3 illustrates an example of the method of controlling the home network system according to the present invention shown in FIG. 1.

Reference will now be made in detail to a method of controlling the home network system shown in FIG. 1 according to the present invention, an example of which is illustrated in FIG. 3. In step S10, the controller 26 included in the master device 20 shown in FIG. 1 registers a plurality of users and stores digital data representing user-specific control settings for controlling operations of the slave devices 30 preset by each registered user in the memory 25. After a user is registered by receiving user identification (ID) or authentication information via the sensor 22 or user interface unit 21 of the master device 20, the registered user sets up the user's own control settings for controlling operations of one or more registered slave devices.

Figure 4:
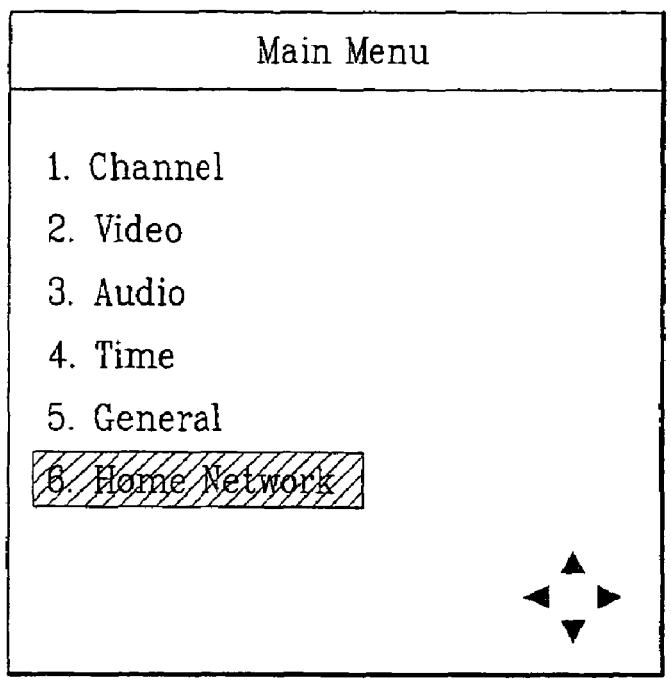
FIG. 4 illustrates an example of a main on-screen display menu displayed on a display unit of the control system according to the present invention.

More specifically, when a user inputs an on-screen display (OSD) menu execution command through the user interface unit 21 (e.g., a remote control unit) of the master device 20, the controller 26 reads the corresponding menu data from the memory 25 and displays a main OSD menu on the display unit 23, an example of which is illustrated in FIG. 4. The main OSD menu includes a list of selectable options for controlling operations of the master device 20 including a Home Network option, as shown in FIG. 4. For example, if the master device 20 is a digital television (TV) receiver, the main menu may include Channel, Video, Audio, Time, General, and Home Network options.

Figure 5A:
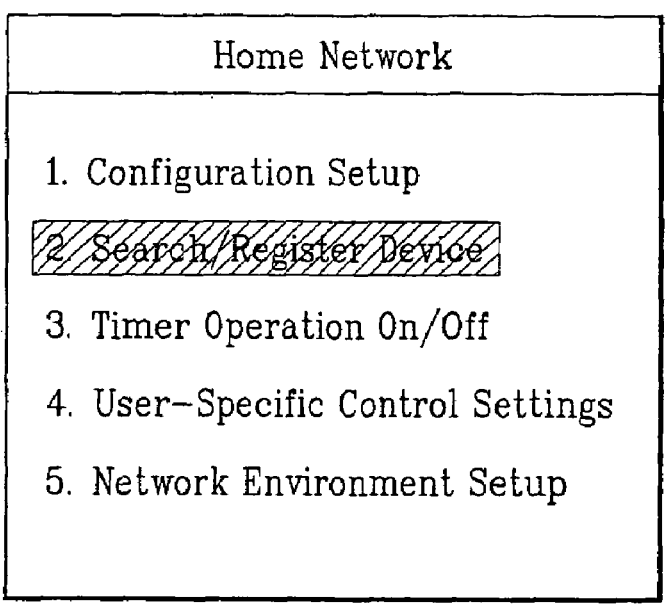
FIGS. 5A and 5B illustrate examples of a Home Network menu displayed on the display unit of the control system according to the present invention.

When the user selects the Home Network option from the main OSD menu, the controller 26 reads the corresponding menu data from the memory 25 and displays a Home Network menu on the display unit 23, an example of which is illustrated in FIG. 5A. Referring to FIG. 5A, the Home Network menu includes a list of selectable home network control options including Configuration Setup, Search/Register Device, Timer Operation On/Off, User-specific Control Settings, and Network Environment Setup options. For example, the user may select the Timer Operation On/Off option in order to activate automatic executions of one or more functions for each registered slave device at the user-specified times or to deactivate any automatic executions previously activated.

Figure 5B:
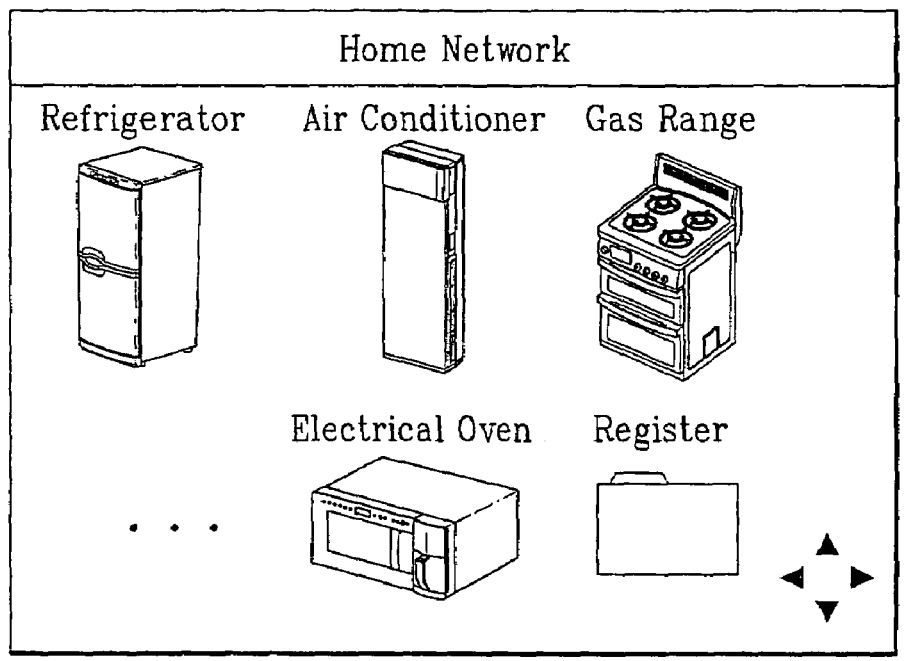

In addition, when the user selects the Search/Register Device option from the Home Network menu, as shown in FIG. 5A, the controller 26 reads the corresponding menu data from the memory 25 and displays a menu associated with the Search/Register Device option, an example of which is illustrated in FIG. 5B. The menu shown in FIG. 5B indicates a list of slave devices previously registered to the master device 20 (or the home network system), and it further includes a Register option for registering a new (unregistered) slave device or appliance. When the Register option is selected from the menu, the controller 26 registers a new slave device by storing its device identification (ID) information into the memory 25.

Figure 6A:
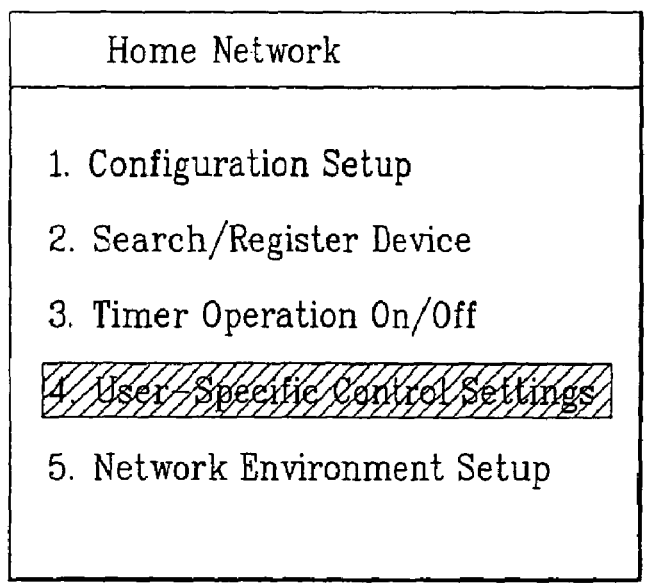
FIGS. 6A to 6F illustrate examples of storing User-specific Control Settings from the Home Network menu on the display unit of the control system according to the present invention.
Figure 6B:
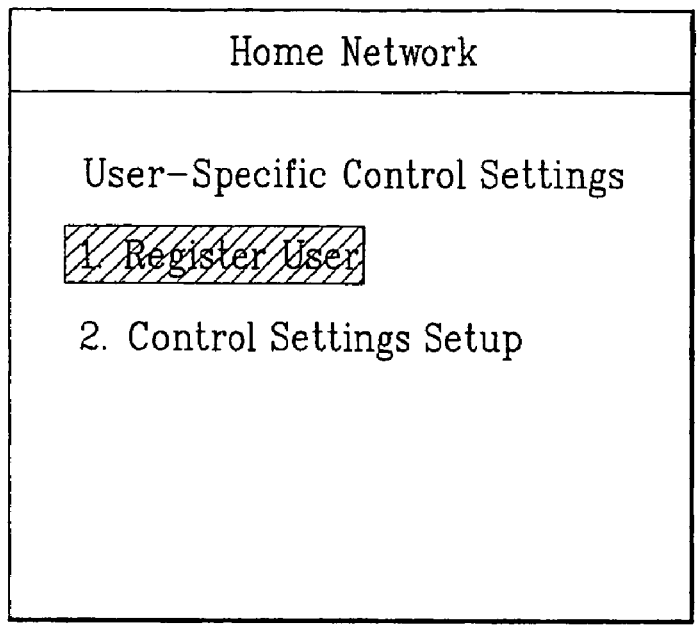

Furthermore, when the user selects the User-specific Control Settings option from the Home Network menu, as shown in FIG. 6A, the controller reads the corresponding data from the memory 25 and displays a menu associated with this option, an example of which is illustrated in FIG. 6B. Referring to FIG. 6B, the menu includes a Register User option for registering a new (unregistered) user and a Control Settings Setup option for setting the user's own control settings for controlling operational functions of one or more slave devices.

Figure 6C:
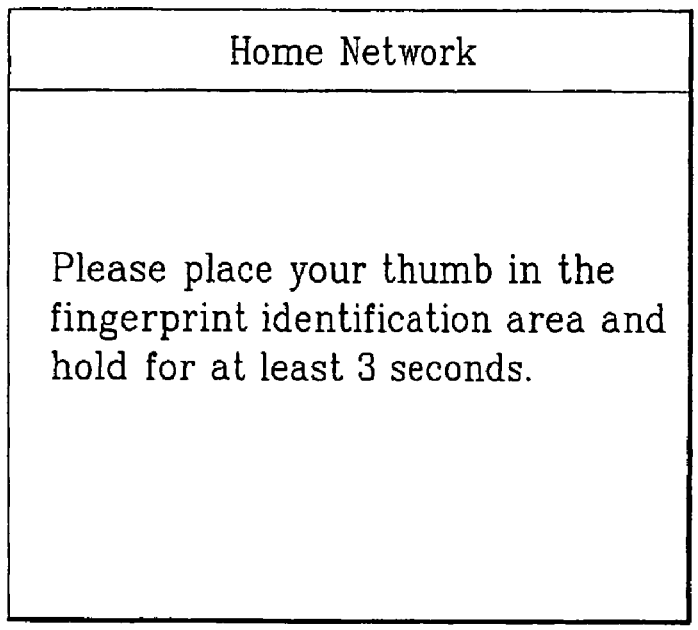

First of all, when a user selects the Register User option, as shown in FIG. 6B, a human-readable instruction message, an example of which is illustrated in FIG. 6C, is displayed on the display unit 23 of the master device 20. Then, the user may input the requested user identification (ID) information into the master device 20 in order to complete the user registration. For example, if the sensor 22 included in the master device 20 is a fingerprint identifiable sensor, the message may be "Please place your thumb in the fingerprint identification area and hold for at least three seconds." When the user places his or her thumb in the fingerprint area, the sensor 22 extracts the fingerprint data of the user and stores the extracted data into the memory 25. Alternatively, the user ID information of the user can be any one of the user's own iris, voice, and weight information which may be entered via the sensor 22 (e.g., an iris, voice, or weight sensor). In addition, the user ID information used for the user registration may be a password previously assigned to the user. In this case, the user can enter his or her password via the user interface unit 21, an example of which is a remote control unit for the master device 20.

Figure 6D:
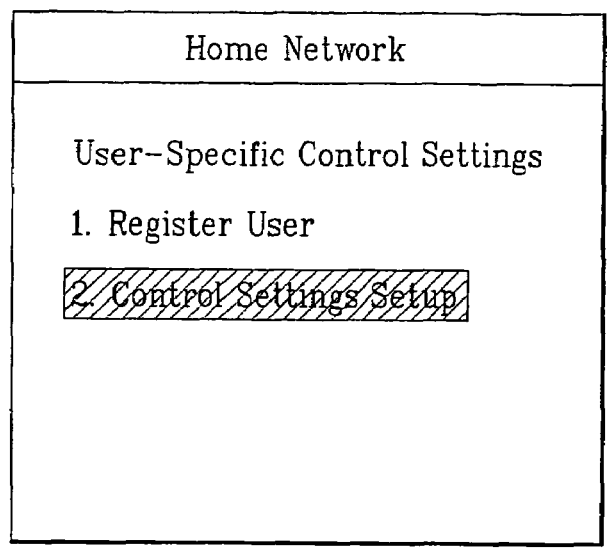
Figure 6E:
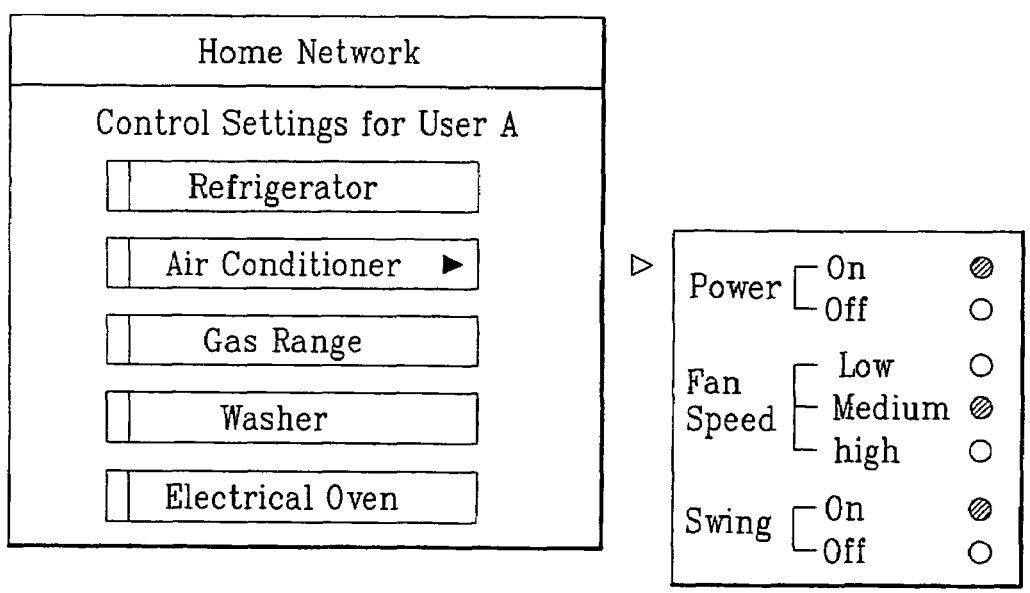
Figure 6F:
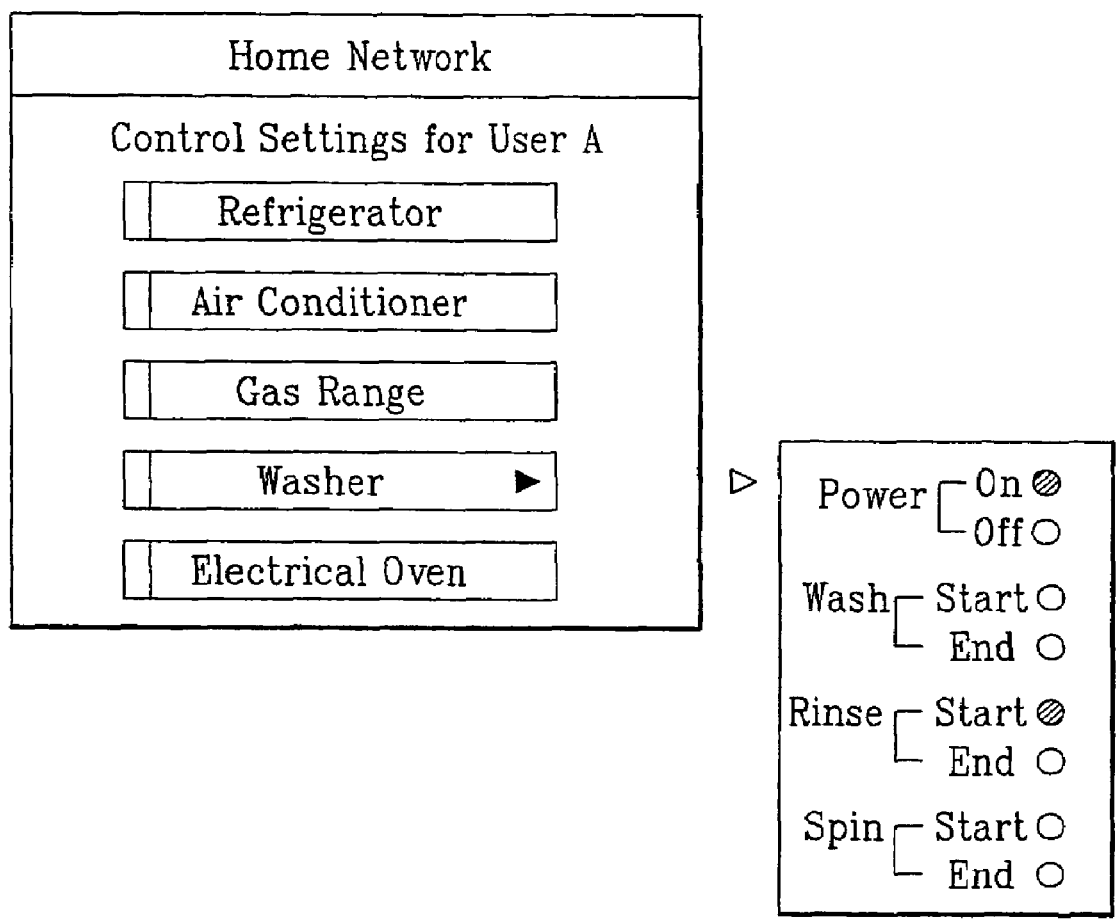

After a user completes the user registration as described above, the registered user can set up the user's own control settings for controlling operations of the slave devices by selecting the Control Settings option from the menu, as shown in FIG. 6D. When this option is selected, a user-specific control settings menu will be displayed on the display unit 23, examples of which are illustrated in FIG. 6E and FIG. 6F. The control settings menu includes a list of selectable registered slave devices. Using this menu, the user is able to control operational functions of one or more registered slave devices in a user's preferred manner.

For example, when the user selects the air conditioner from the list of the registered slave devices included in the menu as shown in FIG. 6E, the options for controlling operations of the air conditioner are displayed. The user can set up the user's own control settings by selecting at least one of these options. The options include options for turning the power of the device on and off, adjusting the fan speed, and activating/deactivating the swing function. Similarly, when the washer is selected from the list, the options for turning the power on/off and for activating/deactivating at least one of wash, rinse, and spin operations will be displayed on the display unit 23 as shown in FIG. 6F. When the user finishes setting up the user's own control settings, the controller 26 stores digital data representing the control settings into the memory 25.

Referring back to FIG. 3, after the digital data representing the control settings for one or more registered users are stored in the memory in step S10, the controller 26 determines whether user identification (ID) information for user authentication is inputted by a use in step S20. If the user ID information is any one of the user's own fingerprint, iris, voice, and weight information, the user ID information may be inputted via the sensor 11 included in the user ID receiver 10 or the sensor 22 included in the master device 20. In addition, if the user ID is a password, it may be inputted via the user interface unit 21 of the master device. If the user ID information is determined to be received in step S20, the controller 26 authenticates the user if the inputted ID information matches with any one of the registered user ID data prestored in the memory 25 in step S20. In other words, it authenticates the user if the user is determined to be any one of one or more users registered in step S10.

Next, the controller 26 determines whether the data representing the control settings preset by the authenticated user exits in the memory 25 in step S40. If it does, the controller 26 extracts the data from the memory 25 in step S50 and automatically controls operations of one or more registered slave devices by sending operation commands to the slave devices in accordance with the extracted control settings data in step S60.

In order to illustrate how the method shown in FIG. 3 is performed, it now will be assumed that user A and user B are registered to the master device 20, which is a digital television (TV) receiver, and user A has previously selected the Power On option for an air conditioner and the Bake option for a gas range in user A's control settings, and user B has selected the Rinse Start option for a washer and the Defrost option for an electrical oven in user B's control settings. When user A returns home from work and inputs his or her fingerprint data into the TV receiver 20 via the user ID receiver 10 or the sensor 22 included in the TV receiver 20, the controller 26 of the TV receiver 20 initially authenticates user A and automatically sends operational commands to the air conditioner and gas range in accordance with the user A's control settings which is prestored in the memory 25. Similarly, when user B inputs the user's own fingerprint data into the TV receiver 20 in a same manner, the controller 26 authenticates user B and automatically sends operational commands to the washer and electrical oven in accordance with the user B's control settings.

Using the control system and the method for a home network system described above, a user is able to automatically control or execute operations of one or more slave devices included in the home network system according to the user's own control settings by simply entering his or her authentication information, where the control settings are previously determined by the user and prestored in the memory 25. Therefore, the efficiency and usability of the home network system in a multi-user environment are greatly improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a home network system in a multi-user environment, the method comprising:
   registering a plurality of users by prestoring their user identification (ID) data into a memory of a digital television receiver serving as a master device coupled to a plurality of slave devices, the digital television receiver including:
      a display unit for displaying a user-readable instruction message for executing user registration and an on-screen display (OSD) menu including a plurality of home network control options; and
      at least one of a user interface unit and a sensor for receiving user ID data input to a controller of the master device;
   prestoring user-specific control settings preset by each registered user into the memory according to selections made by a corresponding registered user selecting from the OSD menu displaying home network control options of at least one slave device;
   receiving user ID data from a prescribed user of the digital television receiver;
   authenticating the prescribed user when the prescribed user is determined to be one of the registered users based on the received user ID data; and
   automatically controlling functions of the at least one slave device according to the pre-stored user-specific control settings of the authenticated user in response to the user ID data inputted to the master device controller by the authenticated user.

2. The method of claim 1, further comprising registering the plurality of slave devices by prestoring their device identification (ID) data into the memory.

3. The method of claim 2, wherein the registering the plurality of slave devices comprises:
   displaying a first menu including a first option for registering a slave device;
   displaying a second menu when the first option is selected from the first menu, the second menu indicating a list of slave devices that are previously registered and a second option for registering a new slave device; and
   registering the new slave device by storing its device ID data into the memory when the second option is selected from the second menu.

4. The method of claim 1, wherein the registering a plurality of users comprises:

displaying a menu including a first option for registering an unregistered user;
displaying an instruction message when the first option is selected from the menu, the message indicating to enter user ID data of the unregistered user; and
receiving the user ID data from the unregistered user and storing the user ID data into the memory.

5. The method of claim 1, wherein the prestoring user-specific control settings preset by each registered user into the memory comprises:
   displaying a first menu including a first option for setting user-specific control settings for a registered user;
   displaying a user-specific control menu when the first option is selected from the first menu, the user-specific control menu indicating a list of selectable slave devices;
   if a slave device is selected from the list of selectable slave devices, displaying a list of selectable control options for controlling operations of the selected slave device; and
   prestoring data representing control settings set by the registered user, the data being set by selecting at least one of the list of selectable control options.

6. The method of claim 1, wherein said authenticating comprises:
   receiving user identification (ID) data from the prescribed user;
   comparing the user ID data received from the prescribed user the user ID data prestored in the memory; and
   authenticating the prescribed user when the user ID data received from the prescribed user matches any one of the prestored ID data.

7. The method of claim 6, wherein the user ID data received from the prescribed user is any one of the user's own fingerprint, iris, voice, weight, and password information.

8. The method of claim 1, wherein the automatically controlling functions of the at least one slave device comprises:
   extracting the user-specific control settings of the authenticated user from the memory according to the user ID data received from the authenticated user; and
   sending present operation commands to the plurality of slave devices according to the extracted user-specific control settings of the authenticated user.

9. The method of claim 1, wherein the user ID data prestored into the memory for each registered user is any one of the user's own fingerprint, iris, voice, weight, and password information.

10. The method of claim 1, wherein the at least one of a user interface unit or a sensor is a remote unit of the digital television receiver.

11. The method of claim 10, wherein the remote unit is installed at a home entrance.

12. The method of claim 1, wherein said authenticating enables the OSD menu display by the display unit.

13. A control system for a home network system in a multi-user environment, the control system comprising:
   a digital television receiver serving as a master device,
   a plurality of slave devices coupled to the master device, and
   a user ID receiver receiving user identification (ID) data from a prescribed user of the digital television receiver,
   the master device comprising:
   a display unit for displaying a user-readable instruction message for executing user registration and an on-screen display (OSD) menu including a plurality of home network control options;

a memory prestoring user-specific control settings preset by a plurality of preregistered users, respectively, and the corresponding user ID data, wherein the user-specific control settings are prestored according to selections made by a corresponding registered user selecting from the OSD menu displaying home network control options of at least one slave device; and a controller coupled to the user ID receiver and the memory, for authenticating the prescribed user upon receiving the user ID data from the user ID receiver, wherein the controller automatically controls functions of the at least one slave device according to the prestored user-specific control settings of the authenticated user, which is extracted from the memory in response to the user ID data inputted to the master device by the authenticated user.

14. The control system of claim 13, wherein the memory further prestores device identification (ID) data of each slave device.

15. The control system of claim 13, wherein the user ID data received from the prescribed user is any one of the user's own fingerprint, iris, voice, weight, and password information.

16. The control system of claim 13, wherein the controller authenticates the prescribed user if the user ID data received from the user ID receiver matches any one of the prestored user ID data of the plurality of preregistered users.

17. The control system of claim 13, wherein the controller automatically controls the functions of the at least one slave device by extracting the prestored user-specific control settings of the authenticated user from the memory according to the user ID data received from the authenticated user and sending preset operation commands to the plurality of slave devices according to the extracted user-specific settings of the authenticated user.

18. The control system of claim 13, wherein the user ID receiver includes at least one of a user interface unit for controlling the digital television receiver and a sensor installed in the digital television receiver.

19. A television receiver for controlling a plurality of slave devices in a home network system, the television receiver comprising:

a main master device of the home network system coupled to the plurality of slave devices;

an user ID input unit for receiving user identification (ID) data from a prescribed user of the television receiver;

a display unit for displaying a user-readable instruction message for executing user registration and an on-screen display (OSD) menu including a plurality of home network control options;

a memory prestoring user-specific control settings preset by a plurality of preregistered users, respectively, and the corresponding user ID data, wherein the user-specific control settings are prestored according to selections made by a corresponding registered user selecting from the OSD menu displaying home network control options at at least one slave device; and a controller coupled to the user ID input unit and the memory for authenticating the prescribed user upon receiving the user ID data from the user ID input unit, wherein the controller automatically controls functions of the at least slave device according to user-specific settings of the authenticated user, which is extracted from the memory in response to the user ID data, inputted to the main master device by the authenticated user.

20. The television receiver of claim 19, wherein the user ID data received from the prescribed user is any one of the user's own fingerprint, iris, voice, weight, and password information.

21. The television receiver of claim 19, wherein the user ID input unit is at least one of a user interface unit for inputting password information and a sensor that is able to identify the fingerprint, iris, voice, or weight information.

22. The television receiver of claim 19, wherein the user ID input unit is a remote unit installed at home entrance.

23. The television receiver of claim 19, wherein the controller authenticates the user if the prescribed user ID data received from the user ID input unit matches any one of prestored user ID data of the plurality of preregistered users.

24. The television receiver of claim 19, wherein the controller automatically controls the functions of the at least one slave device by extracting the prestored user-specific control settings of the authenticated user from the memory according to the user ID data received from the authenticated user and sending present operation commands to the plurality of slave devices according to the extracted user-specific control settings of the authenticated user.

* * * * *